Dec. 22, 1942.            J. N. SELVIG            2,305,904
                        FEEDING APPARATUS
                      Filed March 2, 1940         2 Sheets-Sheet 1

INVENTOR
John N. Selvig
BY
HIS ATTORNEY

Dec. 22, 1942.    J. N. SELVIG    2,305,904
FEEDING APPARATUS
Filed March 2, 1940    2 Sheets-Sheet 2
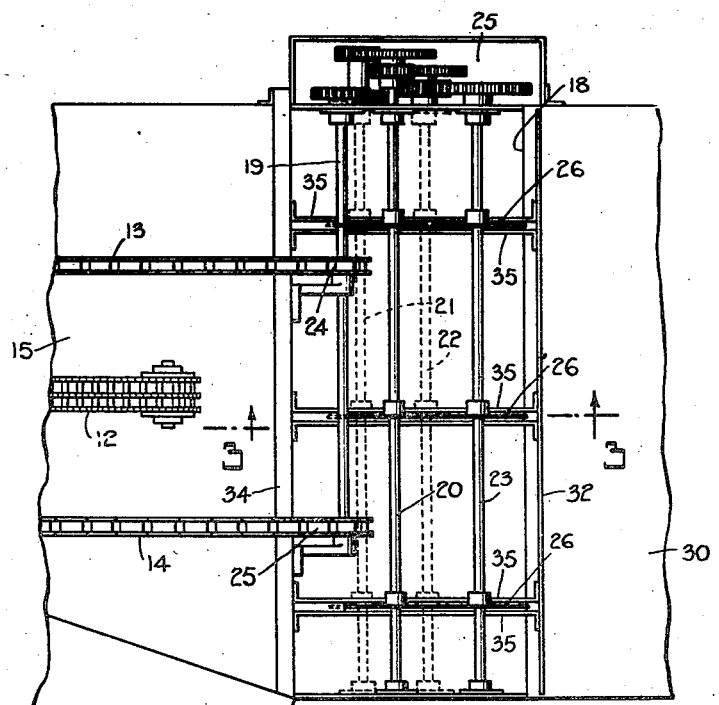
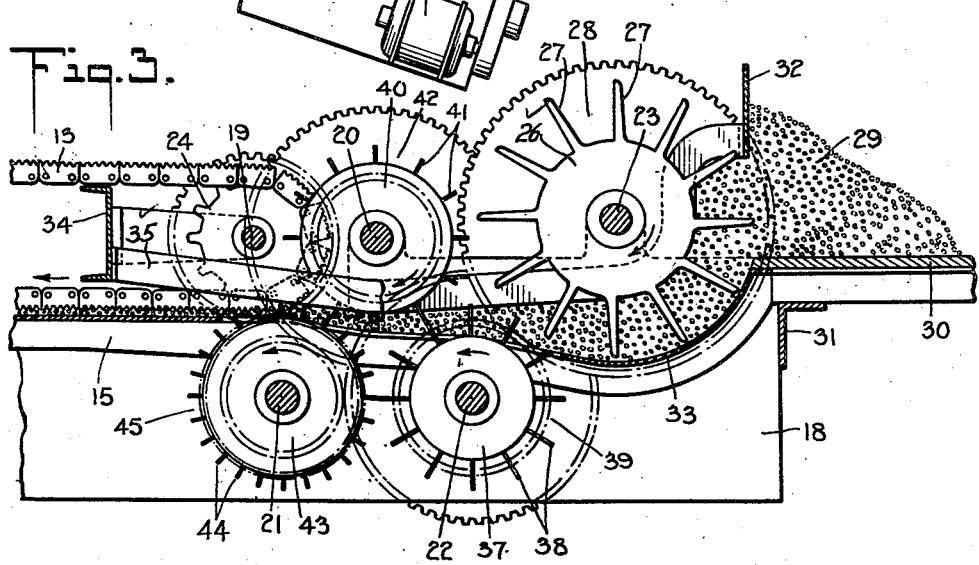
INVENTOR
John N. Selvig
BY
HIS ATTORNEY Patented Dec. 22, 1942

2,305,904

UNITED STATES PATENT OFFICE 2,305,904

FEEDING APPARATUS

John N. Selvig, Westfield, N. J.

Application March 2, 1940, Serial No. 321,821

7 Claims. (Cl. 19—67)

My present invention relates to apparatus for treating fibrous material such as flax, hemp, jute and the like, and more particularly to an apparatus for arranging the fibrous material preparatory to subjecting the same to the operation of liberating the fibrous matter from the shives, etc.

My invention is particularly applicable for use in connection with a decorticating machine such as described and claimed in the patent granted to me on December 5, 1933, under No. 1,937,794, and entitled Apparatus for treating fibrous material, and wherein the stalks of fibrous material are fed to the apparatus which removes the shives therefrom. To obtain the best results from a machine of the character referred to in my said patent, the stalks of fiber are fed to the decorticating apparatus in a relatively thin even layer, and preferably such layer should consist of a single layer of stalks laid side by side in substantially parallel relation and fed to the decorticating machine transversely of the length of the stalks in order to have the decorticating apparatus operate thereon throughout the entire length thereof. In this, my present invention, I have devised a machine for arranging fibrous stalks in a layer of even thickness by feeding the stalks in bundles into the apparatus and gradually reducing the thickness of the layer of stalks until preferably a layer of but a single thickness of stalk is arrived at.

The object is the provision of means for subdividing a bundle of stalks into bundles of smaller size and successively breaking up such bundles into succeeding bundles of smaller size and successively breaking up such bundles into succeeding bundles of still smaller size until the bundles are reduced to practically single stalks, and to deliver such layer of practically single stalks into a traveling conveyor to deliver the same to a decorticating machine.

In the accompanying drawings:

Fig. 2 is an enlarged view of the righthand end of the apparatus shown in Fig. 1, and showing my improved invention in more detail, and Fig. 3 is a sectional side elevation on the line 3—3 of Fig. 2.

Figure 1:
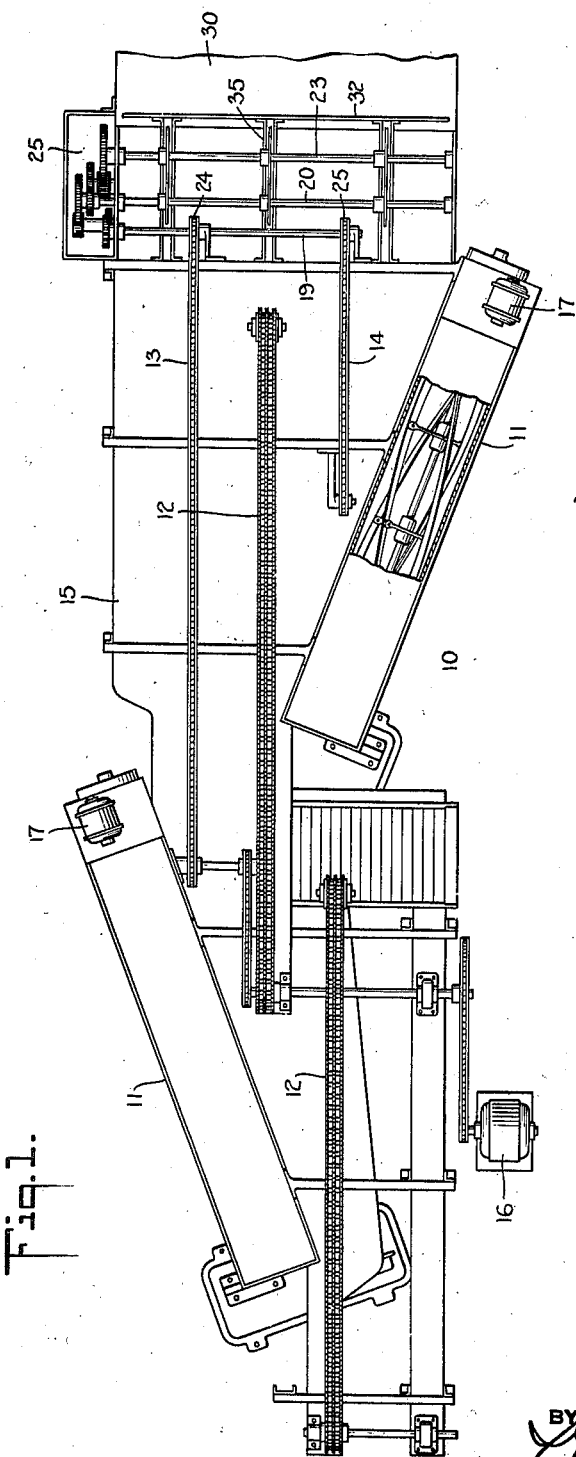
Fig. 1 is a plan view of a decorticating machine with which is associated an apparatus embodying my present invention.

Referring to the drawings, 10 designates generally a decorticating machine similar in character to the decorticating machine described and claimed in my Patent No. 1,937,794, referred to above and which machine includes a plurality of decorticating elements 11, together with an endless stalk conveying belt 12, endless conveyors 13 and 14. The endless conveyors are associated with a platform or table 15. All of such conveyors are driven through suitable means from a source of power, as the motor 16. The decorticating elements 11 are individually driven, each by its own motor 17.

Associated with the conveyors 13 and 14, and the conveyor 12, and situated at the right hand or entrance end of the machine illustrated in Fig. 1, is the feeding apparatus forming the subject matter of my present invention. This apparatus is illustrated in detail in Figs. 2 and 3.

Referring to such figures there is shown a framework 18 in which is arranged a plurality of shafts 19, 20, 21, 22 and 23. The shaft 19 has secured thereto and spaced apart from each other sprocket wheels 24 and 24' over which run the endless conveyor chains 13 and 14, respectively. Secured on one end to each of the shafts 19 to 23, inclusive, are gears constituting a train of gears, described generally by the reference numeral 25, and which train of gears interconnect all of the shafts 19 to 23, inclusive. The shafts 19 to 23 are interconnected in such a manner that they rotate each at a fixed speed with relation to the others, and in such a manner that the peripheral speeds of the successive shafts decrease from the shaft 19 through the shafts 21, 20, 22 and 23 in the order named. Therefore, the shaft 23 rotates at the lowest speed of the group of shafts 19 to 23, inclusive, and this shaft is provided at various points along its length with disks 26.

These disks are each provided with radially extending spaced arms or projections 27, the space between each pair of radially extending arms or teeth forming pockets 28 and into which the stalks 29 of fibrous material may be fed. Adjacent the receiving end of the radially armed disks on the shaft 23 is a stalk receiving platform 30 attached to the framework 18 by the angle iron 31, and the framework 18 is also provided with a vertically extending plate 32 beneath which the stalks 29 of fibrous material are fed.

Extending from the delivery end of the platform 30 to the platform 15 of the decorticating apparatus, shown in Fig. 1, is a guide plate or runway 33. This guide plate forms practically a curved trough, the surface of which conforms generally to the circumference of the radially extending arms 27. At the joining point of the apparatus shown in Fig. 3 with the platform 15 is a U-shaped transversely extending member 34 which has secured thereto the pairs of spaced members 35 and which spaced members extend toward the platform 30 and terminate at the vertical extending member 32. The sets of parallelly arranged members 35, together with the member 33 define a throat or passage of gradually decreasing depth, and through which the stalks 29 of fibrous material are fed by the apparatus.

The sets of spaced members 35 define a space in which work the arms 27 of the disks on the shaft 23 as shown. The shaft 23 is rotated in the direction of the arrow shown in Fig. 3 from the shaft 22 through the gearing train 25. As the shaft 23 rotates in the direction of the arrow shown, the stalks 29 of fibers are engaged by the radially extending arms 27 and the pockets 28 are successively filled with a bundle of stalks taken from the pile fed upon the platform 30 in Fig. 3.

Associated with the shaft 23 and parts carried thereby are disks that are mounted on the shaft 22, these disks being numbered 37. Such disks are provided with radially extending arms 38 which thus form pockets 39 between adjacent arms. The stalks 29 in the pockets 28 associated with the shaft 23 are engaged by the radially extending arms 38 to thus fill the pockets 39 formed thereby and the shaft 22 rotating in the direction of the arrow shown will feed such stalks 29 out of the pockets 28 and further along the throat or passage above referred to.

The shaft 22 is rotated through the gear train 25 at a higher speed than the shaft 23 and at a speed which will enable the radial arms 38 to feed the stalks 29 along the throat or passage greater than that given them by the radial arms 27.

Associated with the shaft 20 are the disks 40, provided with spaced radially extending arms 41, adjacent members of which form pockets 42 between them, and this shaft 20 is rotated at a still higher speed than shafts 22 and 23 and at a rate of speed which will permit the radially extending arms 41 to receive the stalks 29 from the pockets 39 and force the same at a higher speed along the throat or passage referred to. The shaft 21 in turn is provided with a plurality of disks 43 having radially extending arms 44 to form pockets 45 between adjacent arms, and shaft 21 is driven at a higher speed than either of the shafts 20, 22, or 23, and at a speed to impart to the radially extending arms 41 a peripheral speed substantially equal to the linear speed of the endless conveyors 13 and 14.

From the above apparatus, therefore, there results a continuous but gradually increasing speed of travel in a direction transverse of length of the stalks 29, and in such travel, because of the increased speed and decreased thickness of layer of stalks as they approach the endless conveyors 13, the stalks are delivered to the endless conveyors 13 and 14, at which latter stage there is practically but a single layer of stalks.

Whereas, I have described my invention by specific reference to forms thereof, it will be understood that many changes and modifications may be made without departing from the spirit of the invention.

I claim:

1. In an improved feeding device for stalks of fibrous material or the like, the combination of a receiving platform for receiving and holding a plurality of stalks of fibrous material, a runway arranged at the exit end of the receiving platform, a shaft arranged transversely of the runway and adjacent the exit end of the receiving platform, spaced members on said shaft each provided with a plurality of radially extending substantially equally spaced arms defining pockets for receiving and conveying groups of stalks of fibrous material from the receiving platform, and a plurality of substantially similar mechanisms arranged in series with respect to each other and to the first named mechanism and rotating progressively at a higher speed as the distance thereof from the receiving platform increases, whereby the groups of stalks are received in succession, and progressively fed along the runway to thereby thin out the number of stalks per unit of area, and arrange the stalks in a substantially even layer of desired thickness.

2. In an improved feeding device for stalks of fibrous material or the like, the combination of a receiving platform for receiving and holding a plurality of stalks of fibrous material, a runway arranged at the exit end of the receiving platform, a shaft arranged transversely of the runway and adjacent the exit end of the receiving platform, spaced members on said shaft each provided with a plurality of radially extending substantially equally spaced arms defining pockets for receiving and conveying groups of stalks of fibrous material from the loading platform, and a plurality of substantially similar mechanisms arranged in series with respect to each other and to the first named mechanism and rotating progressively at a higher peripheral speed as the distance thereof from the loading platform increases, the spaced members on the shafts being fewer and longer the slower the peripheral speed thereof, whereby the stalks are fed by gravity into the means adjacent the stalk receiving mechanism to effect a uniform continuous flow of stalks diminishing in volume to any desired thickness by the progressively increasing peripheral speed of the feeding means along the progressively decreasing volume of runway.

3. In a feeding device for stalks of fibrous material, a train of interconnected rotary feeding devices, the capacity of each of which is less than that of the preceding one, and means for rotating each of the feeding devices at a constant speed, and at a speed greater than that of the preceding one whereby material fed into the first of said feeding devices is thinned and evened out into a layer of desired thickness as it progresses through the feeding devices.

4. In a feeding device for stalks of fibrous material, the combination of a train of interconnected, rotary stalk feeding devices arranged in series, the capacity of each of the feeding devices being less than the capacity of the preceding feeding device, and means for rotating each of the feeding devices at a constant speed, and at a speed greater than that of the preceding one whereby material fed into the first of said feeding devices is thinned and evened out into a layer of desired thickness as it progresses through the feeding devices.

5. In a feeding device for stalks of fibrous material, the combination of a train of interconnected, rotary stalk feeding devices, each of the devices being arranged about a center, and means for rotating each of the feeding devices at a constant speed, and at a speed greater than that of the preceding one whereby material fed into the first of said feeding devices is thinned and evened out into a layer of desired thickness as it progresses through the feeding devices.

6. In an improved feeding device for stalks of fibrous material or the like, the combination of a receiving platform for receiving and holding a plurality of stalks of fibrous material, a runway arranged at the exit end of the receiving platform, said runway gradually diminishing in depth as the distance from the loading platform increases, a shaft arranged transversely of the runway and adjacent the exit end of the receiving platform, spaced members on said shaft each provided with a plurality of radially extending substantially equally spaced arms defining pockets for receiving and conveying groups of stalks of fibrous material from the receiving platform, and a plurality of substantially similar mechanisms arranged in series with respect to each other and to the first named mechanism, and means for rotating each of said mechanisms at a constant speed and at a speed greater than that of the preceding one whereby material fed into the first of said mechanisms is thinned and evened out into a layer of desired thickness as it progresses through said mechanisms.

7. A feeding device for stalks of fibrous material comprising means to contain a supply of the stalks to be fed, a rotary member having a plurality of transverse pockets in its periphery to receive stalks from the supply, said pockets being each of one cross-sectional area, and a plurality of similar rotary members having a plurality of transverse pockets in their peripheries to receive stalks delivered from the next adjacent rotary member, the pockets of each of the rotary members being of a cross-sectional area less than the pockets of the preceding rotary member, and means for rotating each of the rotary members at a constant speed, and at a speed greater than that of the preceding one whereby material fed into the first of the rotary members is thinned and evened out into a layer of desired thickness as it progresses through the rotary members.

JOHN N. SELVIG.